(12) United States Patent
Martin

(10) Patent No.: US 7,572,390 B2
(45) Date of Patent: *Aug. 11, 2009

(54) COMPOSITION AND METHOD FOR REDUCING CHEMICAL OXYGEN DEMAND IN WATER

(75) Inventor: Roy W. Martin, Downers Grove, IL (US)

(73) Assignee: Truox, Inc., McClellan, CA (US)

( * ) Notice: Subject to any disclaimer, the term of this patent is extended or adjusted under 35 U.S.C. 154(b) by 569 days.

This patent is subject to a terminal disclaimer.

(21) Appl. No.: 11/226,100

(22) Filed: Sep. 14, 2005

(65) Prior Publication Data

US 2006/0293178 A1 Dec. 28, 2006

Related U.S. Application Data

(63) Continuation-in-part of application No. 11/158,676, filed on Jun. 22, 2005, now Pat. No. 7,476,333.

(51) Int. Cl.
C01B 15/08 (2006.01)
C01B 11/00 (2006.01)
C02F 1/72 (2006.01)
C02F 1/76 (2006.01)
C02F 1/68 (2006.01)

(52) U.S. Cl. .......................... 252/186.33; 252/186.21; 252/186.27; 252/186.32; 252/186.34; 252/186.35; 252/186.36; 252/187.1; 252/187.23; 252/187.24; 252/187.27; 252/187.28

(58) Field of Classification Search ............. 252/186.33
See application file for complete search history.

(56) References Cited

U.S. PATENT DOCUMENTS

| | | | |
|---|---|---|---|
| 3,532,634 A * | 10/1970 | Woods | 8/111 |
| 4,492,618 A | 1/1985 | Eder | 205/701 |
| 5,139,762 A * | 8/1992 | Flagella | 423/349 |
| 5,525,121 A * | 6/1996 | Heffner et al. | 8/111 |
| 5,599,781 A * | 2/1997 | Haeggberg et al. | 510/220 |
| 5,607,656 A * | 3/1997 | Soicke et al. | 423/513 |
| 6,139,769 A * | 10/2000 | Nestler | 252/186.39 |
| 6,221,826 B1 * | 4/2001 | Surutzidis et al. | 510/349 |
| 6,409,926 B1 | 6/2002 | Martin | 210/709 |
| 6,863,830 B1 * | 3/2005 | Purdy et al. | 210/756 |
| 7,465,410 B2 * | 12/2008 | Martin et al. | 252/186.25 |
| 2005/0035066 A1 * | 2/2005 | Martin et al. | 210/753 |
| 2005/0155936 A1 * | 7/2005 | Martin et al. | 210/754 |
| 2005/0167635 A1 * | 8/2005 | Martin et al. | 252/186.1 |
| 2005/0261138 A1 * | 11/2005 | Robb et al. | 507/209 |
| 2006/0013750 A1 * | 1/2006 | Martin et al. | 422/241 |
| 2006/0013751 A1 * | 1/2006 | Martin et al. | 422/241 |
| 2006/0078584 A1 * | 4/2006 | Lightcap et al. | 424/405 |

* cited by examiner

Primary Examiner—Joseph D Anthony

(57) ABSTRACT

A method and composition for reducing chemical oxygen demand is presented. The composition includes a persulfate donor, a transition metal catalyst in contact with the persulfate donor, and a cationic electrolyte. When the composition is contacted by water, the transition metal catalyst reacts with persulfate and reduces the persulfate concentration in the water. The composition allows the use of persulfate, which is known to cause irritation to users of aquatic facilities (e.g., pools, spas) that come in contact with it. As the persulfate concentration is reduced rapidly in the water by the catalyzed reaction, the persulfate-containing product may be applied while the aquatic facilities are being used. A free halogen donor may be incorporated into the composition. The composition may be in the form of powder, granules (coated or uncoated), or agglomerate. The cationic electrolyte facilitates the removal of the catalyst from the water.

37 Claims, 1 Drawing Sheet

COMPOSITION AND METHOD FOR REDUCING CHEMICAL OXYGEN DEMAND IN WATER

CROSS-REFERENCE TO RELATED APPLICATION

This patent application is a continuation-in-part (CIP) of U.S. patent application Ser. No. 11/158,676 filed on Jun. 22, 2005 now U.S. Pat. No. 7,476,333, the content of which is incorporated by reference herein in its entirety.

FIELD OF INVENTION

This invention relates generally to cleaning an aquatic facility and more particularly to cleaning an aquatic facility that contains organic contaminants.

BACKGROUND

Aquatic facilities such as swimming pools and spas have become increasingly popular in private homes, hotels, fitness centers, and resorts. To ensure that the aquatic facilities can be enjoyed safely, the water must be treated to reduce or eliminate chemical oxygen demands (COD) and/or total organic carbon (TOC). When the COD and/or TOC increases in the water, the oxidation reduction potential of the water decreases and oxidizers are added to maintain a healthy level of oxidation reduction potential. A common oxidizer that is used in aquatic facilities is chlorine or bromine. However, when chlorine or bromine is present in the water above a certain level in the presence of COD and/or TOC, trihalomethanes (THM) and chloramines form in the water undesirably.

Common ingredients for treating water systems include various persulfate salts and persulfate donors such as potassium monopersulfate (PMPS), which is typically available in the form of a triple salt, $(KHSO_5)_x \cdot (KHSO_4)_y \cdot (K_2SO_4)_z$ (herein referred to as "PMPS triple salt"). However, persulfate salts, such as potassium persulfate ($K_2S_2O_8$), are difficult to use because they cause severe irritation to facility users (e.g., swimmers, bathers) at concentrations above about 2 ppm. The strong oxidation potential of PMPS triple salt makes it effective for decreasing the concentration of COD. Typically, these chemicals are applied to the aquatic facility through a "shock treatment" whereby the facility is evacuated and the product is broadcast across the water surface. The facility users may not be allowed to come in contact with the treated water for a period of time after the treatment due to concerns for irritation.

PMPS usually contains potassium persulfate ($K_2S_2O_8$) as a result of being prepared using oleum. Persulfates have a long halflife in aquatic water facilities and are undesirable. As a result of the concerns for irritation resulting from accumulation of persulfate, PMPS can be used only at limited dosages, which typically do not exceed two pounds per 10,000 gallons of water per week.

While PMPS maintains the water quality in aquatic facilities reasonably well, it is not convenient to use because of the need to evacuate the facility during use and the fact that it can only be used in limited doses regardless of how heavily the facility is used. Thus, a way of cleaning the water without these inconvenient limitations is desired.

SUMMARY

In one aspect, the invention is a composition for reducing chemical oxygen demand in water. The composition includes a persulfate donor, a transition metal catalyst in contact with the persulfate donor, and a cationic charged electrolyte. The cationic electrolyte coagulates the spent transition metal catalyst, facilitating the removal of the catalyst from the water.

In another aspect, the composition includes a free halogen donor, a persulfate donor, a cationic electrolyte, and a transition metal catalyst. The free halogen donor, the persulfate donor, the cationic electrolyte, and the transition metal catalyst form an agglomerate.

In yet another aspect, the invention is a method of removing chemical oxygen demand from water. The method entails preparing a persulfate solution, adding a catalyst to the persulfate solution, adding a cationic electrolyte to the persulfate solution, and feeding the persulfate solution to the water.

The invention is also a composition for removing chemical oxygen demand from an aquatic facility, wherein the composition includes: a transition metal catalyst in an amount that makes up between about 0.01 wt. % and about 10 wt. % of the composition, a cationic charged electrolyte that makes up between about 0.05 wt. % and about 20 wt. % of the composition, and a persulfate donor in an amount that makes up between about 70-99.98 wt. % of the composition.

DETAILED DESCRIPTION OF THE EMBODIMENT(S)

Figure 1:
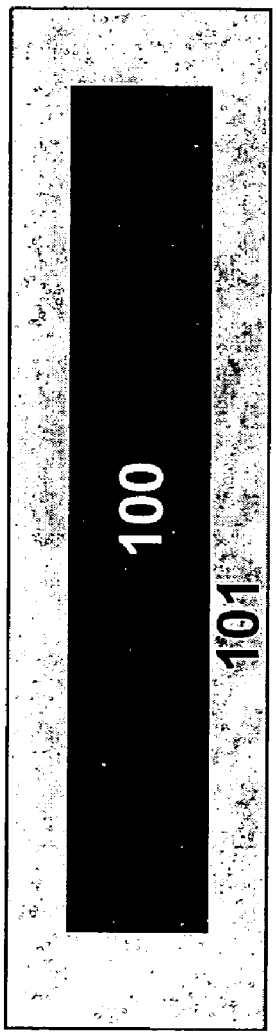
FIG. 1 shows an agglomerate having multiple layers.

As used herein, a "persulfate donor" is any compound or composition that includes at least 0.5 wt. % $S_2O_8^{2-}$ donor, such as sodium persulfate, potassium persulfate, and PMPS (potassium monopersulfate) produced from oleum.

The invention discloses a composition and a method for removing the COD from aquatic facilities while the facility is being used by swimmers, bathers, etc. With the invention, the COD is decomposed as it is added to the water. Thus, the formation of THMs and chloramines is significantly reduced and the quality of air and water around the aquatic facilities is enhanced.

The invention allows the application of potentially irritating oxidants (e.g., potassium persulfate) while the water is being used by swimmers/bathers. Irritation to the bathers is avoided by using a catalyst that rapidly reacts with the persulfate to form sulfate free radicals. This rapid catalyzed reaction eliminates the concern of persulfate accumulation, and effectively decomposes the organic contaminants shortly after being added to the water, thereby preventing their accumulation.

The invention entails applying a catalyst to the water to maintain an "effective catalyst concentration," which is between about 1 ppb and about 1 ppm, more preferably between about 5 ppb and about 500 ppb. A persulfate donor is added to the water, inducing the in-situ generation of sulfate free radicals through a catalyzed reaction. Sulfate free radicals have a reported potential of about 2.6 v. The cationic electrolyte, the catalyst, and the persulfate donor may be added separately to the water. Preferably, the catalyst and the persulfate are added at or around the same time as each other since the catalyst is required to induce the formation of the free radicals. The cationic electrolyte may be added to the water after the catalyst is spent to remove the spent catalyst.

When a low level of persulfate is applied to water in the presence of the catalyst, sulfate free radicals are formed that effectively decompose the organic compounds, as follows:

$$S_2O_8^{2-} + Catalyst \rightarrow Catalyst + SO_4^{2-} + .SO_4^-$$

$$.SO_4^{2-} + H_2O \rightarrow OH^- + HSO_4^-$$

When the sulfate free radicals decompose the organic compounds, any sanitizer (e.g., free halogen donor) in the water is freed to effectively control the bacteria and viral counts.

The persulfate donor may be potassium monopersulfate, sodium persulfate, potassium persulfate, or any combination thereof.

The catalyst may be a transition metal donor, e.g. silver or copper ion donor. In some embodiments, the catalyst may also be cobalt, iron, molybdenum, platinum, manganese, or a combination thereof. If desired, a chelating agent may be included to delay and extend the performance of the catalyst. To limit or prevent the catalyst from precipitating, the pH of the water is preferably maintained at between about 6.8 and about 8.0, and more preferably between about 7.0 and about 7.8. The transition metal catalyst may make up between about 0.01 wt. % and about 10 wt. % of the composition.

The cationic electrolyte may be an inorganic salt such as Alum or sodium aluminate, or an organic polymer such as polyacrylamide or chitosan. The cationic electrolyte coagulates the spent catalyst.

In one exemplary embodiment, the transition metal catalyst constituted between about 0.01 wt. % and about 10 wt. % of the composition, the persulfate donor constituted between about 70 wt. % and about 99.98 wt. % of the composition, and a cationic charged electrolyte made up about 0.05-20 wt. % of the composition.

The persulfate donor, the cationic electrolyte, and the catalyst can also be combined with a free halogen donor. Free halogen donors act as effective sanitizer/oxidizer that rids the water of inorganic nitrogen such as mono- and di-chloroamines. Where free halogen donor is incorporated into the composition, the free halogen donor may make up between about 50-99 wt. % of the composition. The persulfate donor, the cationic electrolyte, and the catalyst would make up about 1-50 wt. % of the composition. The catalyst alone may make up about 0.00001 wt. % to 10 wt. % of the composition, and the cationic charged electrolyte would make up about 0.05-20 wt. % of the composition.

The composition can be either a powder mixture, granular mixture, or agglomerate containing the persulfate donor, cationic electrolyte, and the catalyst. The composition of the invention effectively delivers the persulfate donor to the water while maintaining the effective catalyst concentration in the water.

To form the powder mixture, the catalyst and the cationic electrolyte are admixed with the persulfate donor in a mixer such as a ribbon mixer or equivalent mixing or tumbling equipment.

To form the granules, the persulfate donor may be prepared into granules and coated with the catalyst and cationic electrolyte. The catalyst and the cationic electrolyte may be deposited on the surface of the granule uniformly or nonuniformly. In some embodiments, the coating may include a barrier film that isolates the persulfate donor from the surrounding environment (e.g., a free halogen donor).

The persulfate-catalyst-electrolyte powder mixture or the persulfate granules coated with the catalyst and the cationic electrolyte can be used as is or agglomerated under pressure to form a tablet. The agglomerate/tablet is made of a plurality of granules or powder packed into a tablet of the desired shape. The agglomerate may contain an agent that restricts the dissolution rate of the tablet. Examples of such agents include a substantially water-insoluble wax such as polyethylene wax, polyoxyethylene wax and their respective fatty acid ester wax. An agent can also be a mineral salt of a carboxylic acid having at least 16 carbons, such as calcium stearate and similar hydrocarbon-based salts. Further still, the agent may be a gel-forming material such as a polaxamers, polyacrylic acid, polyacrylamide, polyvinyl alcohol, polysaccharides such as Xanthan, and various cellulose-based derivatives. The gel-forming material forms a gelatinous structure upon being exposed to water, effectively controlling the rate at which the agglomerate dissolves in the water.

FIG. 1 shows an agglomerate (also referred to as a "tablet") having multiple layers. An outer layer 101 contains the persulfate donor, the catalyst, and halogen if applicable. An inner layer 100 contains the cationic electrolyte. The outer layer 101 surrounds or encapsulates the inner layer 100 so that when the agglomerate comes in contact with water, the persulfate donor and the catalyst will be released before the cationic electrolyte is released. This order of release is advantageous because the persulfate donor and the catalyst induce formation of sulfate free radicals that enhance the destruction of the COD. Then, the cationic electrolyte precipitates the spent catalyst to prevent the spent catalyst from accumulating in the water. The multi-layered agglomerate is formed by putting a small amount of core component (i.e., the cationic electrolyte) between the surrounding components (i.e., the catalyst, the persulfate donor, and the halogen admixed together) before being pressed. Alternatively, a smaller tablet of the core component may be formed first, then surrounded by the powder of the surrounding components, and pressed.

Figure 2:
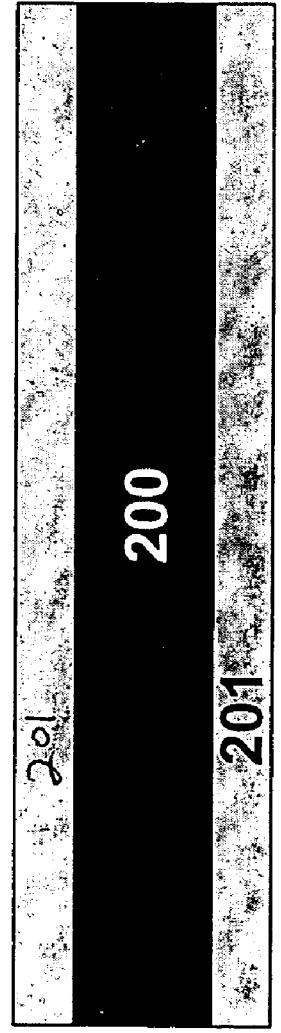
FIG. 2 shows an alternative embodiment of the agglomerate having multiple layers.

FIG. 2 shows an alternative embodiment of the agglomerate having multiple layers. In this embodiment, a layer 200 containing the cationic electrolyte is sandwiched between layers 201 that contains the persulfate donor, the catalyst, and the halogen if applicable. To produce the embodiment of FIG. 2, the persulfate donor and the catalyst are admixed and pressed to form a layer. A separate layer of cationic electrolyte is formed, also by pressing, and the two types of layers are combined.

The embodiment of FIG. 1 encases the coagulant so that most or all of the persulfate donor and catalyst are released before the coagulant (cationic electrolyte) is released, ensuring that reactions take place before the catalyst is removed. The embodiment of FIG. 2 may be used where the catalyst is chelated. In the embodiment of FIG. 2, some coagulant will be released at the same time as the persulfate donor and the catalyst. However, if the catalyst is chelated, the chelant prevents the catalyst from coming in contact with the coagulant until the catalyst is spent and the chelant is destroyed.

The agglomerate can be commercially produced using a multi-layer tableting equipment such as a "Hata three-layer tableting press" sold by Elizabeth-Hata International, located at 14559 Route 30, 101 Peterson Drive, North Huntingdon, Pa. However, a Carver press can also be used for laboratory scale productions using established tableting techniques.

The composition can also be combined with a sanitizer such as trichloroisocyanuric acid. Chemical oxygen demand generally impedes the sanitizer from performing its function. When the composition removes the chemical oxygen demand, the sanitizer is able to effectively improve the water quality without impediment.

The composition may be used periodically to prevent the COD level in water from getting too high. It may also be used to recover aquatic facilities that are already highly contaminated with organic based COD.

EXAMPLE 1

1000 mL of a water-based stock solution containing 7.0 ppm persulfate was prepared by adding potassium persulfate (purchased from Sigma-Aldrich) to water and adjusting the pH to 7.2 using sodium bisulfate. The persulfate level was initially and periodically tested using ammonium thiocyanate and ferrous iron in an acidic solution. The stock solution was divided into 2-500 mL samples, and magnetic stirring rods were added to each sample. Using the magnetic stirrer, each sample was vigorously mixed to achieve a vortex reaching approximately half the distance to the stirring rod.

TABLE 1

Persulfate Decomposition Rate

| Lapsed Time (Hrs.) | Persulfate Conc. (ppm) with 0.63 ppm Ag catalyst | Persulfate Conc. (ppm) with 0.31 ppm Ag catalyst |
|---|---|---|
| 0 | 7.0 | 7.0 |
| 3 | 4.2 | 5.6 |
| 5 | 2.1 | 4.2 |
| 7 | <1.0 | 2.8 |

Table 1 shows that the persulfate concentration decreased with time. The test results in Table 1 illustrate that the catalyst, under conditions like those experienced in pools, can effectively decompose the persulfate irritant.

As the reactions proceed and the hydroxyl radicals are reduced, the pH of the solution increases. Therefore, during the test period, the pH was measured every 30 minutes and a solution of sodium bisulfate was administered as needed to maintain the pH at a range of about 7.2 to 7.5.

The test result indicates that when the reaction occurs in COD-laden water, the sulfate free radicals will enhance the effectiveness of the treatment (e.g., PMPS treatment) for decomposing the COD. Moreover, with the persulfate irritant being removed rapidly with the catalyst, the invention allows PMPS (which is usually accompanied by some persulfate) to be applied while swimmers and bathers are present in the water.

EXAMPLE 2

0.6 grams of potassium persulfate ($K_2S_2O_8$) was dissolved in 99.4 grams of water. Sodium bisulfate was added to drop the pH to 3.4. A sample of this potassium-persulfate-solution was taken and diluted with water to achieve a water to sample weight ratio of 99:1. The persulfate concentration was measured at 49 ppm.

0.1 grams of cuprous chloride (CuCl) was added to the stock persulfate solution and mixed for 10 minutes. Then, a sample of this CuCl-persulfate-solution was taken and diluted to a water-sample weight ratio of 99:1. The persulfate concentration in the resulting solution was 0.0 ppm.

Another sample of the CuCl-persulfate-solution was taken and diluted with 99:1 weight ratio of water to sample to prepare a stock solution. The resulting copper (Cu) concentration was 4.9 ppm.

0.1 grams of alum was added to the stock solution, the pH was raised to 7.3, and the sample was mixed for 5 minutes. The sample was then allowed to settle. A sample was decanted, diluted, and tested for copper. The resulting copper (Cu) concentration was 0.78 ppm.

The tests in the Examples above show that the catalyst, under the low pH conditions, effectively remove the persulfate by converting the persulfate to sulfate free radicals in the presence of a cationic electrolyte (alum) at near neutral pH conditions. The spent catalyst was effectively coagulated and removed from the solution.

The composition, which is substantially soluble in water, may be made into a solution before being added to the COD-laden water. In some cases, the solution is prepared in a container before being delivered to the pool by an eductor system, a chemical metering pump, or pressure differential between the inlet and outlet water supply of the container. In other cases, the solution is made by adding the composition (e.g., in agglomerated form) to the circulating water of the system.

If desired, additional persulfate donor can be fed separately to the water to further enhance the formation of sulfate free radicals.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention.

What is claimed is:

1. A composition for reducing chemical oxygen demand in water of an aquatic facility, the composition comprising:
   a persulfate donor from about 70 wt. % to about 99.98 wt. %;
   a transition metal catalyst measured as elemental metal between about 0.01 wt. % and about 10 wt. % of the composition, and
   a cationic electrolyte from about 0.01 wt. % to about 10 wt. % of the composition that coagulates the spent catalyst; and
   upon dissolving the composition in water the catalyst decomposes the persulfate to produce sulfate free radicals and sustains a persulfate concentration in the water of the aquatic facility of less than 2 ppm.

2. The composition of claim 1, wherein the composition is powder.

3. The composition of claim 1, wherein the composition is granular.

4. The composition of claim 1, wherein the composition is an agglomerate.

5. The composition of claim 4 further comprising an agent that restricts a dissolution rate of the agglomerate in water.

6. The composition of claim 5, wherein the agent is a substantially water-insoluble wax.

7. The composition of claim 5, wherein the agent is a mineral salt of a carboxylic acid having at least 16 carbons.

8. The composition of claim 5, wherein the agent is a gel forming material that forms a gelatinous structure upon contacting water.

9. The composition of claim 1, wherein the persulfate donor is at least one of: potassium monopersulfate, sodium persulfate, and potassium persulfate.

10. The composition of claim 1, wherein the transition metal catalyst comprises silver.

11. The composition of claim 1, wherein the transition metal catalyst comprises copper.

12. The composition of claim 1, wherein the transition metal catalyst comprises cobalt.

13. The composition of claim 1, wherein the transition metal catalyst comprises iron.

14. The composition of claim 1, wherein the transition metal catalyst comprises molybdenum.

15. The composition of claim 1, wherein the transition metal catalyst comprises platinum.

16. The composition of claim 1, wherein the transition metal catalyst comprises manganese.

17. The composition of claim 1, further comprising a chelating agent in contact with the transition metal catalyst.

18. The composition of claim 1, wherein the composition is usable while mammals are present in the water.

19. The composition of claim 1, wherein the cationic electrolyte is an inorganic salt.

20. The composition of claim 19, wherein the inorganic salt is alum.

21. The composition of claim 19, wherein the inorganic salt is an aluminate.

22. The composition of claim 1, wherein the cationic electrolyte is an organic polymer.

23. The composition of claim 22, wherein the organic polymer is a polyacrylamide.

24. The composition of claim 22, wherein the organic polymer is chitosan.

25. A composition for reduction of chemical oxygen demand in water, the composition comprising:
    a free halogen donor from about 50-99 wt. % of the composition;
    a persulfate donor comprising potassium monopersulfate;
    a cationic electrolyte from about 0.05 wt. % to about 20 wt. % of the composition that coagulates the spent catalyst; and
    a transition metal catalyst comprising cobalt;
    wherein the free halogen donor, the persulfate donor, the cationic electrolyte and the transition metal catalyst form an agglomerate.

26. The composition of claim 25, wherein the composition is soluble in water.

27. The composition of claim 25 further comprising a chelating agent in contact with the transition metal catalyst.

28. The composition of claim 1, wherein the cationic electrolyte is an inorganic salt.

29. The composition of claim 28, wherein the inorganic salt is alum.

30. The composition of claim 28, wherein the inorganic salt is an aluminate.

31. The composition of claim 25, wherein the free halogen donor is at least one of: calcium hypochlorite, trichloroisocyanuric acid, dichloroisocyanuric acid, dibromodimethyl hydantoin, bromochlorodimethyl hydantoin, and lithium hypochlorite.

32. The composition of claim 25, wherein the persulfate donor is separated from the free halogen donor.

33. The composition of claim 25 further comprising a chlorite donor.

34. The composition of claim 25, wherein the persulfate donor and the transition metal catalyst comprise about 1-50 wt. % of the composition.

35. The composition of claim 25, wherein the composition is usable while mammals are present in the water.

36. A composition for removing chemical oxygen demand from an aquatic facility, the composition comprising:
    a transition metal catalyst in an amount that makes up about 0.01 wt. % and about 10 wt. % of the composition measured as elemental metal;
    a cationic electrolyte that coagulates the spent catalyst in an amount that makes up about 0.01 wt. % to about 20 wt. % of the composition; and
    a persulfate donor comprising potassium monopersulfate in an amount that makes up about 70-99.98 wt. % of the composition; and
    upon dissolving the composition in water, the catalyst decomposes the persulfate to produce sulfate free radicals and sustains a persulfate concentration in the water of the aquatic facility of less than 2 ppm.

37. A composition for reducing chemical oxygen demand in the water of an aquatic facility while mammals are present, the composition comprising:
    potassium monopersulfate from about 70-99.98 wt. % of the composition; and
    a transition metal catalyst in an amount that makes up about 0.01 wt. % and about 10 wt. % of the composition measured as elemental metal, and comprising at least one of copper and silver; and
    a cationic electrolyte that coagulates the spent catalyst in an amount that makes up about 0.01 wt. % to about 20 wt. % of the composition; and
    upon dissolving the composition in water, the catalyst decomposes the persulfate to produce sulfate free radicals and sustains a persulfate concentration in the water of the aquatic facility of less than 2 ppm.

* * * * *